United States Patent Office 3,657,241
Patented Apr. 18, 1972

3,657,241
SUBSTITUTED CINNOLINE COMPOUNDS
Norman H. Kurihara, Walnut Creek, Calif., assignor to
The Dow Chemical Company, Midland, Mich.
No Drawing. Filed Mar. 12, 1970, Ser. No. 19,127
Int. Cl. C07d 51/08
U.S. Cl. 260—250 A                11 Claims

ABSTRACT OF THE DISCLOSURE

Substituted cinnolines corresponding to the formula

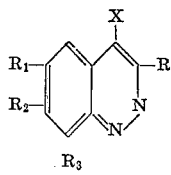

where R is —CN or —CONH$_2$, X is —Cl or —Br, R$_1$ is —H, —Cl, —Br, —F or —C$_n$H$_{2n+1}$, $n$ being an integer of from 1 to about 4, and R$_2$ and R$_3$ independently are —H or —Cl. The compounds are suitable for use as fungicides, herbicides and insecticides.

SUMMARY OF THE INVENTION

The present invention relates to new and useful substituted cinnolines and more particularly is directed to substituted cinnoline carbonitriles and cinnoline carboxamides corresponding to the formula

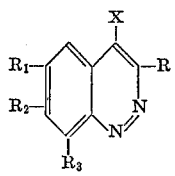

where:

R is —CN or —CONH$_2$,
X is —Br or —Cl,
R$_1$ is —H, —Cl, —Br, —F or lower alkyl of formula —C$_n$H$_{2n+1}$, $n$ being an integer of from 1 to about 4, and R$_2$ and R$_3$ independently are —H or —Cl.

The compounds normally are pale yellow to yellow colored solids; they are moderately soluble in various organic liquids commonly used as solvents such as, for example, benzene, toluene, acetone, chloroform, methylenedichloride and the like and exhibit a low solubility in water.

The new compounds of the present invention are suitable for use as herbicides, fungicides, and insecticides.

In general the 4-halo-cinnoline carbonitriles are prepared by reacting a corresponding 4-hydroxy-3-cinnoline carboxamide with a halogenating agent such as a phosphorus oxychloride (e.g. POCl$_3$) or phosphorus oxybromide (e.g. POBr$_3$). Other halogenating agents can be employed; it is essential only that such agents provide both for replacement of the hydroxy group with the corresponding halogen and the dehydration of the carboxamido group to the carbonitrile without resulting in undesirable degradation of the molecular structure.

Ordinarily in preparing the 4-halo substituted cinnoline carbonitriles of the present invention, a 4-hydroxy-3-cinnoline carboxamide and an excess of a phosphorus oxyhalide selected to replace the hydroxy group with a desired halogen in the four position of the cinnoline molecule are mixed together and the resulting mixture stirred for an extended period of time; i.e., several hours or more, usually at room temperature. Following this reaction period, the mass is heated and refluxed for a period of from about 5 minutes to an hour or more, usually from about 15 to about 30 minutes. The resulting syrupy product is poured over ice or into ice water and the aqueous mixture neutralized. The desired 4-halo-3-cinnoline carbonitrile product is separated and recovered from the aqueous product mixture, ordinarily by extraction with an organic solvent; e.g., chloroform, benzene, methylene dichloride and the like. The compound is recovered from it sorganic extract by conventional means such as evaporting the solvent and crystallizing the product. If desired, the compound can be further purified by recrystallization from appropriate solvents, chromatographic techniques or other methods as known to one skilled in the art.

In actual practice of the invention, preferably a 4-hydroxy-3-cinnoline carboxamide is admixed with an excess of the phosphorus oxyhalide reactant. This assures better product yield; also, the phosphorus oxychloride in excess of that which actually undergoes reaction serves as a reaction medium and a heat sink during the preparation of the halo-substituted carbonitrile compound. Although equimolar proportions of the cinnoline carboxamide: phosphorus oxyhalide, or even in excess of the cinnoline carboxamide, can be used, preferably, as set forth hereinbefore, the phosphorus oxyhalide is used in excess of the stoichiometric quantity required theoretically for reaction with the 4-hydroxy-3-cinnoline carboxamide. Phosphorus ovyhalide:4-hydroxy-3-cinnoline carboxamide reactant molar proportions of from about 1 to 100 to about 1 to 10 ordinarily are used.

Generally, the 4-halo-3-cinnoline carboxamides of the present invention are prepared by partially hydrolyzing the corresponding 4-halo-3-cinnoline carbonitriles. This process ordinarily is carried out by heating a selected carbonitrile in an excess of an acidic solution of hydrogen peroxide or sulfuric acid following conventional proceduces commonly employed for preparing amides from nitriles.

DESCRIPTION OF PREFERRED EMBODIMENTS

The following examples will serve to further illustrate a number of preferred embodiments of the present invention but are not meant to limit it thereto.

EXAMPLE 1

4,6-dichloro-3-cinnoline carbonitrile

Phosphorus oxychloride (125 milliliters, 210 grams) was added to 5 grams of 6-chloro-4-hydroxy-3-cinnoline carboxamide and the mixture was stirred at room temperature for about 5 hours. After this period, the reaction mass was refluxed for 15 minutes and excess phosphorus oxychloride removed under reduced pressure.

The resulting syrupy product mixture was poured into 400 milliliters of ice water and the aqueous solution neutralized with saturated sodium bicarbonate solution. The so-neutralized mixture was extracted three times with separate 50 milliliter portions of chloroform, the three portions of the chloroform extract containing the desired product were combined and dried over magnesium sulfate. The so-dried chloroform extract was decolorized with activated charcoal, filtered and concentrated whereupon a yellow product precipitated.

This product was further purified by chromatographic techniques on a silica gel column using benzene as the eluent. Two grams of yellow prisms were recovered. These melted at 142–143°C.

Elemental chemical analysis showed (percent): C, 48.2; H, 1.2; N, 18.9.

The theoretical elemental analysis for 4,6-dichloro-3-cinnoline carbonitrile,

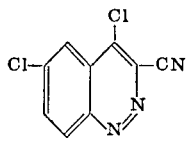

is (percent): C, 48.3; H, 1.4; N, 18.8.

The structure was confirmed by its mass and infrared spectra, the presence of a —CN group being shown by the latter spectrum at 2250 cm.$^{-1}$.

EXAMPLE 2

4-chloro-6-bromo-3-cinnoline carbonitrile

4 - hydroxy - 6 - bromo-3-cinnoline carboxamide (7.5 grams) was introduced into 150 milliliters of phosphorus oxychloride and the resulting mixture stirred at room temperature overnight (~18 hours). The mixture then was heated at reflux for about 15 minutes and excess phosphorus oxychloride removed under reduced pressure.

The remaining syrup was poured into 400 milliliters of ice water and the aqueous mixture extracted with chloroform in the same general manner as set forth in Example 1. The combined chloroform extract was dried and the desired product recovered therefrom and purified, again following the procedure described in Example 1. About one gram of a pale yellow powder melting at 159–160° C. was obtained.

Elemental chemical analysis gave (percent): C, 40.3; H, 1.3; N, 15.9.

The theoretical elemental analysis for 4-chloro-6-bromo-3-cinnoline carbonitrile,

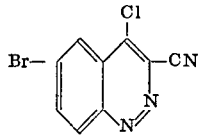

is (percent): C, 40.3; H, 1.1; N, 15.7. Infrared spectroscopy confirmed the structure, a —CN group being indicated at 2250 cm.$^{-1}$. Mass spectroscopy further substantiated the assigned structure.

EXAMPLE 3

4,6-dibromo-3-cinnoline carbonitrile

A mixture of 2.2 grams of 4-hydroxy-6-bromo-3-cinnoline carboxamide and 10 grams of phosphorus oxybromide were mixed together and the mixture heated on a steam bath for 3 hours. The mixture was poured onto 200 milliliters of ice and the resulting aqueous solution neutralized with sodium bicarbonate. The desired product was recovered and purified following the procedures set forth in Example 1, except that a 50:50 volume mixture of benzene:chloroform was used as the eluent for the chromatographic purification. About 1.35 grams of a yellow powder were obtained, the compound melted at 175–178° C.

Elemental chemical analysis of the product showed (percent): C, 33.7; H, 1.2; N, 13.3.

The theoretical elemental analysis for 4,6-dibromo-3-cinnoline carbonitrile,

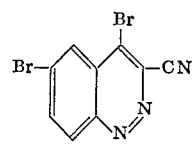

is (percent): C, 34.54; H, 0.97; N, 13.43.

The structure was substantiated by mass spectroscopy and infrared spectroscopy.

EXAMPLE 4

Following the same general procedures set forth for the preceding examples, a number of 4-chloro-3-cinnoline carbonitriles were prepared by reacting a corresponding 4-hydroxy-3-cinnoline carboxamide with phosphorus oxychloride.

The products prepared and their properties are summarized in Table I.

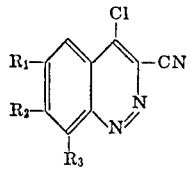

TABLE I
Product

| Run No. | $R_1$ | $R_2$ | $R_3$ | Form | M.P., °C. | Found C | Found H | Found N | Theoretical C | Theoretical H | Theoretical N |
|---|---|---|---|---|---|---|---|---|---|---|---|
| 1 | F | H | H | Pale yellow prisms | 151–152 | 52.1 | 1.4 | 20.3 | 52.1 | 1.5 | 20.2 |
| 2 | H | Cl | Cl | Yellow needles | 262–263 | 42.1 | 0.1 | 16.5 | 41.8 | 0.8 | 16.3 |
| 3 | CH$_3$ | H | H | do | 166–168 | 58.6 | 3.1 | 20.1 | 59.0 | 3.0 | 20.6 |
| 4 | H | H | H | Yellow powder | 177–178.5 | 57.3 | 2.3 | 22.5 | 57.0 | 2.1 | 22.2 |

The infrared spectra and mass spectra support the assigned structure for each compound.

EXAMPLE 5

In a manner similar to that described for the foregoing examples, 4-bromo-6-butyl-3-cinnoline carbonitrile (M.W. 264.18) is prepared by reacting phosphorus oxybromide and 4-hydroxy-6-butyl-3-cinnoline carboxamide.

Similarly 4-bromo - 3 - cinnoline carbonitrile (M.W. 208.06) is similarly prepared from 4-hydroxy-3-cinnoline carboxamide and phosphorus oxybromide.

4,8-dichloro-3-cinnoline carbonitrile (M.W. 224.08) is made by reacting 4-hydroxy-8-chloro-3-cinnoline carboxamide and phosphorus oxychloride.

EXAMPLE 6

4,6-dichloro-3-cinnoline carboxamide

One gram of 4,6-dichloro-3-cinnoline carbonitrile was added to 10 milliliters of concentrated sulfuric acid (18 molar) and the mixture heated on a steam bath for about one hour. The resulting product mixture was poured over ice whereupon a yellow solid precipitated. This product was separated from the aqueous phase, washed with water and dried. About 0.75 gram of yellow powder was obtained; this melted at about 225° C. with decomposition.

Elemental chemical analysis gave (percent): C, 44.7; H, 2.4; N, 16.9.

The theoretical elemental analysis for 4,6-dichloro-3-cinnoline carboxamide

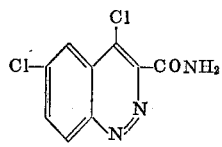

is (percent): C, 44.66; H, 2.08; N, 17.36.

The structure was confirmed by infrared spectroscopy and mass spectroscopy.

Following this same general procedure, 4-chloro-6-fluoro-3-cinnoline carboxamide (M.W. 225.64) is prepared by partial hydrolysis of 4-chloro-6-fluoro-3-cinnoline carbonitrile.

4-chloro-6-bromo - 3 - cinnoline carboxamide (M.W. 286.56), 4,7,8-trichloro-3-cinnoline carboxamide (M.W. 276.56), 4-chloro-6-methyl - 3 - cinnoline carboxamide (M.W. 221.65), 4-chloro-3-cinnoline carboxamide (M.W. 201.64), 4 - bromo - 3 - cinnoline carboxamide (M.W. 252.10), 4,6-dibromo - 3 - cinnoline carboxamide (M.W. 331.02), 4-chloro - 6 - propyl - 3 - cinnoline carboxamide (M.W. 249.73), and 4-bromo-6-fluoro-3-cinnoline carboxamide (M.W. 270.10) are prepared by partially hydrolyzing the corresponding 4-halo-3-cinnoline carbonitrile.

It has been established that compounds of the present invention are suitable for use as fungicides against a variety of fungi. In representative operations, each of 4-chloro-6-bromo-3-cinnoline carbonitrile, 4-chloro - 3 - cinnoline carbonitrile, 4-chloro-6-fluoro-3-cinnoline carbonitrile, 4-chloro-6-methyl-3-cinnoline carbonitrile, 4,6-dibromo-3-cinnoline carbonitrile, and 4,6-dichloro-3-cinnoline carbonitrile at a concentration of 500 parts per million was found to give complete control and kill of the fungal organisms *Staphylococcus aureus, Canadida albicans, Trichophton mentagrophytes, Bacillus subtilis, Aspergillus terreus, Candida pelliculosa, Pullularia pullulans, Salmonella typhosa* and *Rhizopus nigricans.*

In another representative operation, 4,7,8-trichloro-3-cinnoline carbonitrile at 500 parts per million gave complete control and kill of the fungal organisms *Trichophton mentagrophytes, Ceratocystis ips* and *Cephaloascus fragans.*

In other representative operations at a concentration of 500 parts per million, 4,6-dichloro-3-cinnoline carboxamide was found to give complete control and kill of the fungal organisms *Staphylococcus aureus, Candida albicans, Mycobacterium phlei,* Athletes foot, *Bacillus subtillis, Candida pelliculosa, Pullularia pullulans, Cephaluascus fragans, Ceratocystis ips,* Trichoderm sp. Madison p–42, *Asperigllus terreus* and *Rhizopus nigricans.*

Some of the compounds have been found to be useful as herbicides in the control of undesired vegetation. Each of 4-chloro-3-cinnoline carbonitrile, 4-chloro-6-fluoro-3-cinnoline carbonitrile, and 4,6-dichloro-3-cinnoline carbonitrile at 10 parts per million in representatve operations gave complete control and kill of the waterplant—elodea.

Also, compounds of the present invention are suitable for use in the control and kill of insects. For example, 4,6-dichloro-3-cinnoline carbonitrile at 5 parts per million gave complete control and kill of yellow-fever mosquito.

The 4-hydroxy-3-cinnoline carboxamide reactants readily are prepared in a standard manner by the reaction of the corresponding methyl ester with ammonium hydroxide shown schematically as follows:

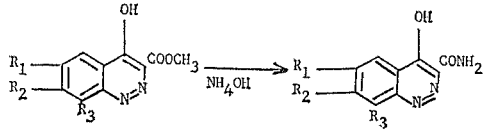

The methyl esters in turn are prepared by reacting the corresponding acid,

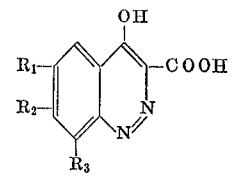

with a methanol/hydrogen chloride reactant.

The acids are made from the corresponding substituted anilines by following the procedures set forth in one of the Barber et al., U.S. 2,797,218; Barber et al., J. Chem. Soc. 2828 (1961); or, Castle et al., J. Helero Chem. 1, 98 (1964).

I claim:
1. Substituted cinnoline compounds corresponding to the formula

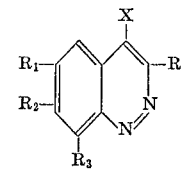

wherein:

R is —CN or —CONH$_2$,

X is —Br or —Cl,

R$_1$ is —H, —Cl, —Br, —F or lower alkyl of formula C$_n$H$_{2n+1}$, $n$ being an integer of from 1 to about 4, and R$_2$ and R$_3$ independently are —H or —Cl.

2. The compounds as defined in claim 1 where R is —CN.

3. The compounds as defined in claim 1 where R is —CONH$_2$.

4. A compound as defined in claim 1 which is 4,6-dichloro-3-cinnoline carbonitrile.

5. A compound as defined in claim 1 which is 4-chloro-6-fluoro-3-cinnoline carbonitrile.

6. A compound as defined in claim 1 which is 4-chloro-6-bromo-3-cinnoline carbonitrile.

7. A compound as defined in claim 1 which is 4,7,8-trichloro-3-cinnoline carbonitrile.

8. A compound as defined in claim 1 which is 4-chloro-6-methyl-3-cinnoline carbonitrile.

9. A compound as defined in claim 1 which is 4-chloro-3-cinnoline carbonitrile.

10. A compound as defined in claim 1 which is 4,6-dibromo-3-cinnoline carbonitrile.

11. A compound as defined in claim 1 which is 4,6-dichloro-3-cinnoline carboxamide.

References Cited
UNITED STATES PATENTS

| | | | |
|---|---|---|---|
| 3,167,552 | 1/1965 | Lowrie | 260—250 A |
| 3,239,526 | 3/1966 | Lowrie | 260—250 A |

NICHOLAS S. RIZZO, Primary Examiner

U.S. Cl. X.R.

424—250; 71—92